(12) United States Patent
Wu et al.

(10) Patent No.: US 9,898,321 B2
(45) Date of Patent: Feb. 20, 2018

(54) DATA-DRIVEN FEEDBACK CONTROL SYSTEM FOR REAL-TIME APPLICATION SUPPORT IN VIRTUALIZED NETWORKS

(71) Applicant: AT&T Intellectual Property I, L.P., Atlanta, GA (US)

(72) Inventors: Tsong-Ho Wu, Englishtown, NJ (US); Wen-Jui Li, Bridgewater, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 368 days.

(21) Appl. No.: 14/806,906

(22) Filed: Jul. 23, 2015

(65) Prior Publication Data
US 2017/0024234 A1    Jan. 26, 2017

(51) Int. Cl.
G06F 9/455    (2006.01)
G06F 9/46    (2006.01)

(52) U.S. Cl.
CPC ...... *G06F 9/45558* (2013.01); *G06F 9/45533* (2013.01); *G06F 9/466* (2013.01); *G06F 2009/45595* (2013.01)

(58) Field of Classification Search
None
See application file for complete search history.

(56) References Cited

U.S. PATENT DOCUMENTS

| | | |
|---|---|---|
| 7,213,065 B2 | 5/2007 | Watt |
| 8,395,621 B2 | 3/2013 | Tung et al. |
| 8,396,986 B2 | 3/2013 | Kanada et al. |
| 8,423,632 B2 | 4/2013 | Yin et al. |
| 8,943,506 B2 | 1/2015 | Tang et al. |
| 8,949,429 B1 * | 2/2015 | Chuang ............ G06F 9/50 709/224 |

(Continued)

OTHER PUBLICATIONS

Koponen et al., "Network Virtualization in Multi-tenant Datacenters," $11_{th}$ USENIX Symposium on Networked Systems Design and Implementation, 2014, pp. 203-216, USENIX Association.

(Continued)

*Primary Examiner* — Adam Lee
(74) *Attorney, Agent, or Firm* — Hartman & Citrin LLC

(57) ABSTRACT

Concepts and technologies disclosed herein are directed to data-driven feedback control systems for an acceptable level of real-time application transaction completion rate in virtualized networks, while maximizing virtualized server utilization. According to one aspect disclosed herein, a network virtualization platform ("NVP") includes a plurality of hardware resources, a virtual machine ("VM"), and a virtual machine monitor ("VMM"). The VMM can track an execution state of each of a plurality of applications associated with the VM. The VMM can measure a real-time application transaction completion rate of the VM. The VMM can determine whether a trigger condition exists for priority scheduling of real-time applications based upon the real-time application transaction completion rate and a pre-set threshold value. The VMM can, in response to determining that the trigger condition exists, apply a priority control schedule to instruct the VM to perform priority processing of a real-time application over a non-real-time application.

20 Claims, 9 Drawing Sheets

(56) References Cited

U.S. PATENT DOCUMENTS

| | | | |
|---|---|---|---|
| 9,122,503 B1* | 9/2015 | Hoff | G06F 21/566 |
| 2007/0300230 A1* | 12/2007 | Barsness | G06F 9/4881 |
| | | | 718/103 |
| 2013/0290489 A1* | 10/2013 | Branson | H04L 67/104 |
| | | | 709/219 |
| 2015/0081885 A1 | 3/2015 | Thomas et al. | |

OTHER PUBLICATIONS

Melo et al., "Network Virtualization: A Step Closer for Seamless Resource Mobility," IFIP/IEEE International Symposium on Integrated Network Management (IM2013): Short Paper, 2013, pp. 692-695, IEEE.

Kreutz et al., "Software-Defined Networking: A Comprehensive Survey," Oct. 8, 2014, proceedings of the IEEE 103.1 (2015): 14-76.

Drutskoy et al., "Scalable Network Virtualization in Software-Defined Networks," Internet Computing, IEEE 17.2 (2013): 20-27.

VMware Technical White Paper, "The CPU Scheduler in VMware vSphere® 5.1—Performance Study," 2013, VMware.

* cited by examiner

DATA-DRIVEN FEEDBACK CONTROL SYSTEM FOR REAL-TIME APPLICATION SUPPORT IN VIRTUALIZED NETWORKS

BACKGROUND

Cloud computing can allow dynamically scalable virtualized resources to be provided as a service. Cloud computing can assure an appropriate level of resources are available to power software applications when and where the resources are needed in response to demand. As a result, cloud computing allows entities to respond quickly, efficiently and in an automated fashion to the rapidly changing business environment.

Real-time and virtualization by design are at odds with each other. Virtualization spreads computing resources across multiple virtual machines as a way to increase server utilization and flexibility. Real-time applications dedicate specific resources to reduce computing overhead and to ensure low latency. Currently, network virtualization platforms ("NVPs") utilize fair scheduling and load balancing to maximize server utilization. Fair scheduling and load balancing functions do not support real-time application performance requirements well during capacity reduction and/or network overload events. Thus, both technical and business challenges exist for how to optimize tradeoffs between maximum virtualized server utilization and an acceptable level of real-time application transaction completion rate.

SUMMARY

Concepts and technologies disclosed herein are directed to a data-driven feedback control system that achieves an acceptable level of real-time application transaction completion rate in virtualized networks, while maximizing virtualized server utilization. Moreover, the concepts and technologies disclosed herein can be utilized to at least meet one or more service level agreements ("SLAs") when network capacity is strained or in an overload condition.

According to one aspect disclosed herein, a network virtualization platform ("NVP") includes a plurality of hardware resources, one or more virtual machines ("VMs"), and one or more virtual machine monitors ("VMMs"), which can include one or more real-time VMMs. In some embodiments, the NVP includes a plurality of server clusters, wherein each server cluster includes a plurality of hardware resources, a plurality of VMs, and a real-time VMM. The VMM can include a plurality of data-driven feedback control modules that, when executed by a compute resource of the plurality of hardware resources, causes the VMM to perform operations. In particular, the VM can apply fair scheduling control for all applications as part of a baseline scheduling control scheme. The VMM can track an execution state of each of a plurality of applications associated with the VM, including real-time applications and non-real-time applications. The VMM can measure a real-time application transaction completion rate of the VM. The VMM can determine whether a trigger condition exists for priority scheduling of real-time applications based upon the real-time application transaction completion rate and a pre-set real-time transaction completion rate threshold value. The VMM can, in response to determining that the trigger condition exists, apply a priority control schedule to instruct the VM to perform priority processing of a real-time application of the plurality of applications over a non-real-time application of the plurality of applications. The VMM can reapply the baseline fair scheduling control scheme when the trigger condition is determined to be cleared in order to maximize virtualized server utilization.

In some embodiments, the plurality of data-driven feedback control modules includes a VM fair scheduling module. In these embodiments, the VMM can apply the baseline scheduling control scheme to instruct the VM to perform baseline processing of the plurality of applications, including real-time and non-real-time applications.

In some embodiments, the plurality of data-driven feedback control modules includes a real-time application execution state monitoring module. In these embodiments, the VMM can determine whether an application transaction of the real-time application is in a processing queue for execution. In response to determining that the application transaction of the real-time application is in a processing queue for execution, the VMM can record a state change from a ready/wait execution state to a run execution state. The VMM also can determine whether the application transaction of the real-time application completed successfully. If the application transaction completed successfully, the VMM can increment a successful application transaction completion counter and can report the successful application transaction completion counter to a priority scheduling trigger module of the plurality of data-driven feedback control modules. If the application transaction did not complete successfully, the VMM can increment an unsuccessful application transaction completion counter and can report the unsuccessful application transaction completion counter to the priority scheduling trigger module of the plurality of data-driven feedback control modules. A total real-time application transaction count in a given time period can be measured by summing the application transactions that completed successfully and the application transactions that completed unsuccessfully in the given time period.

In some embodiments, the plurality of data-driven feedback control modules includes a priority scheduling trigger module and a priority scheduling control module. In these embodiments, the VMM can receive the successful application transaction completion counter and the unsuccessful application transaction completion counter from the real-time application execution state monitoring module. The VMM can determine a critical condition. The critical condition can be expressed as a real-time application transactions completion rate below a pre-set threshold value. The VMM can, in response to determining that the critical condition exists, notify the priority scheduling control module of the critical condition.

In some embodiments, the VMM can receive notification from the priority scheduling trigger module that a critical condition exists. In response to receiving notification from the priority scheduling trigger module, the VMM can apply the priority control schedule to instruct the VMM to perform priority processing of the real-time application of the plurality of applications over the non-real-time application of the plurality of applications.

In some embodiments, the VMM can reset a first execution state of the non-real-time application on the VM to ready/wait. The VMM also can set a second execution state of the real-time application on the virtual machine to run. In some embodiments, the VMM can reset the first execution state prior to a time-out.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
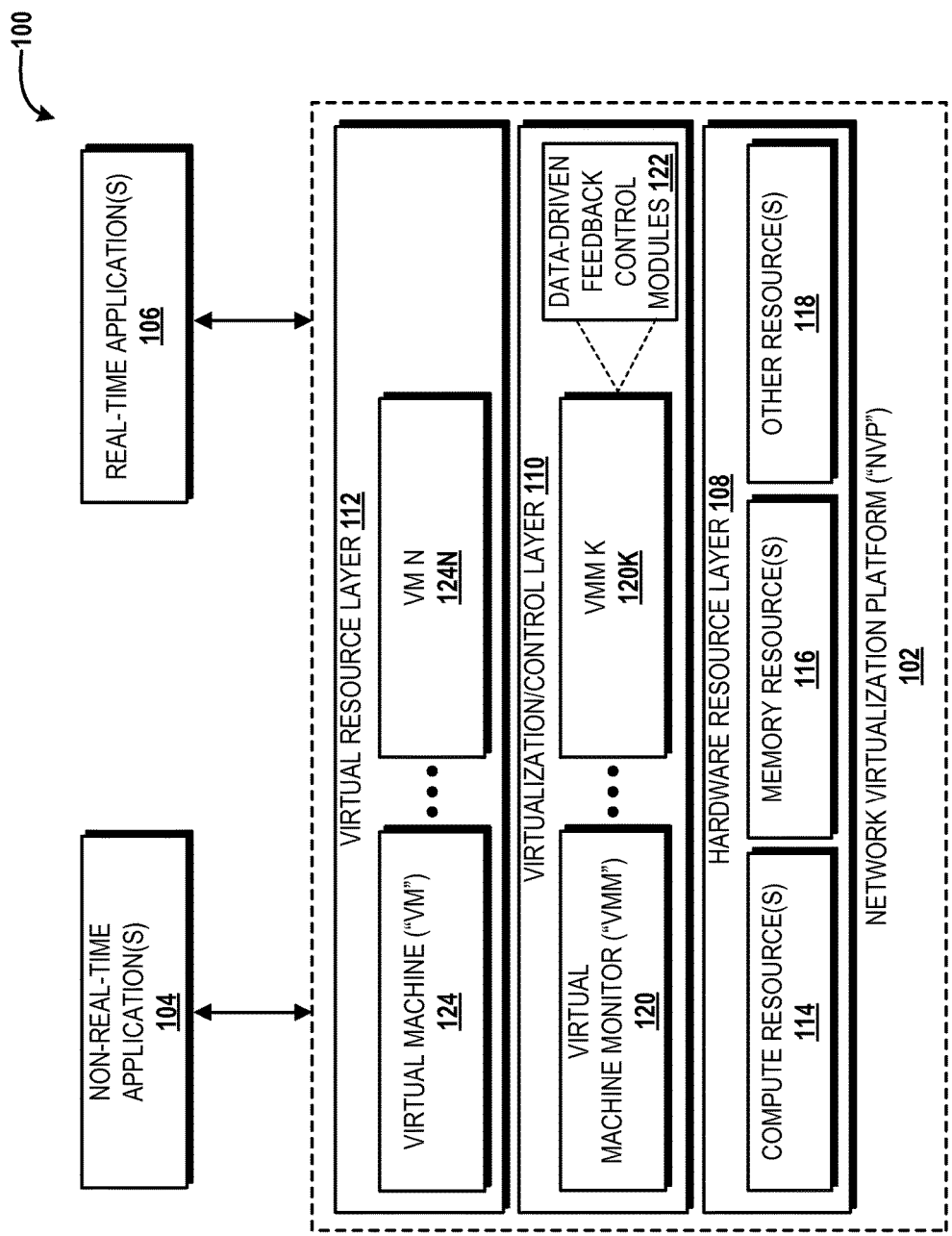
FIG. 1 is a block diagram illustrating aspects of an illustrative operating environment for implementing the various concepts and technologies disclosed herein.

Real-time and virtualization by design are at odds with each other. Virtualization spreads computing resources across multiple virtual machines as a way to increase server utilization and flexibility. Real-time applications dedicate specific resources to reduce computing overhead and to ensure low latency. Currently, network virtualization platforms utilize fair scheduling and load balancing to maximize server utilization. Fair scheduling and load balancing functions do not support real-time application performance requirements well during capacity reduction and/or network overload events. Thus, both technical and business challenges exist for how to optimize tradeoffs between maximum virtualized server utilization and an acceptable level of real-time application transaction completion rate.

The concepts and technologies disclosed herein are directed to a closed-loop feedback control system that maintains maximum virtualization benefits (server utilization) subject to an acceptable level of real-time applications transaction completion rate in a given time period. The feedback control closed-loop model integrates monitoring strategy, data analytics, and application scheduling control via a closed-loop sequential flow of real-time application performance monitoring, key performance indicator ("KPI") measurements, KPI violation feedback control triggering, real-time priority control initiation, and real-time feedback data monitoring and measurement. As used herein, "real-time' is the actual time during which monitoring is performed.

User-defined, on-demand cloud services and user digital experience expectations are driving planning and deployment of network functional virtualization and service-centric software-defined networking among global telecommunications service providers. Network Virtualization Platforms ("NVPs") are deployed in information technology ("IT") data centers and network central offices to accelerate deployment of on-demand user service and virtualized network functions. An NVP is a shared virtualized infrastructure that supports multiple services and network applications (including real-time and non-real-time applications). However, the current design of virtualization is to maximize server utilization, which could significantly affect support of real-time applications when network capacity is in strained conditions or the network is in overload conditions. This can affect the adoption of NVP and slow down wide-spread commercial offerings of user-defined cloud services and deployment of software-centric cloud networking infrastructure.

A benefit of the concepts and technologies disclosed herein is the ability to maximize NVP serviceable potential of being deployed in user-defined cloud service environments supporting both real-time and non-real-time applications without changing current fair-based scheduling design of NVP. The concepts and technologies disclosed herein provide a data-driven heuristic model utilized to maximize virtualization benefits (server utilization) subject to a real-time application transaction completion rate to an acceptable level via a closed loop feedback-control model. The concepts and technologies disclosed herein also provide a feedback control model utilized to integrate a closed-loop sequential flow of real-time application performance monitoring, KPI measurements, KPI violation feedback control triggering, real-time priority control initiation, and real-time feedback data monitoring and measurement.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Referring now to FIG. 1, aspects of an operating environment 100 for implementing various embodiments of the concepts and technologies disclosed herein will be described. The illustrated operating environment 100 includes a network virtualization platform ("NVP") 102. The NVP 102 is a shared infrastructure that can support multiple services and network applications, including one or more non-real-time applications 104 and one or more real-time applications 106. The real-time applications 106 can include, but are not limited to, one or more applications that provide or utilize, at least in part, domain name service ("DNS"), remote authentication dial-in user service ("RADIUS"), dynamic host configuration protocol ("DHCP"), lightweight directory access protocol ("LDAP"), content routing in either or both of the control and data planes, and route reflecting in either or both of the control and data planes. The real-time applications 106 also can include one or more applications that provide, at least in part, one or more real-time services such as, but are not limited to, voice over internet protocol ("VoIP") service, streaming video service, videoconferencing service, online gaming service, chatting service, instant messaging ("IM") service, and the like in the service plane.

The illustrated NVP 102 includes a hardware resource layer 108, a virtualization/control layer 110, and a virtual resource layer 112 that work together to perform operations as will be described in detail herein. While connections are shown between some of the components illustrated in FIG. 1, it should be understood that some, none, or all of the components illustrated in FIG. 1 can be configured to interact with one another to carry out various functions described herein. In some embodiments, the components are arranged so as to communicate via one or more networks (best shown in FIG. 8). Thus, it should be understood that FIG. 1 and the following description are intended to provide a general understanding of a suitable environment in which various aspects of embodiments can be implemented, and should not be construed as being limiting in any way.

The hardware resource layer 108 provides hardware resources, which, in the illustrated embodiment, include one or more compute resources 114, one or more memory resources 116, and one or more other resources 118. The compute resource(s) 114 can include one or more hardware components that perform computations to process data, and/or to execute computer-executable instructions of one or more application programs, operating systems, and/or other software. The compute resources 114 can include one or more central processing units ("CPUs") configured with one or more processing cores. The compute resources 114 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 114 can include one or more discrete GPUs. In some other embodiments, the compute resources 114 can include CPU and GPU components that are configured in accordance with a co-processing CPU/GPU computing model, wherein the sequential part of an application executes on the CPU and the computationally-intensive part is accelerated by the GPU. The compute resources 114 can include one or more system-on-chip ("SoC") components along with one or more other components, including, for example, one or more of the memory resources 116, and/or one or more of the other resources 118. In some embodiments, the compute resources 114 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 114 can be or can include one or more hardware components architected in accordance with an ARM architecture, available for license from ARM HOLDINGS of Cambridge, United Kingdom. Alternatively, the compute resources 114 can be or can include one or more hardware components architected in accordance with an x86 architecture, such an architecture available from INTEL CORPORATION of Mountain View, Calif., and others. Those skilled in the art will appreciate the implementation of the compute resources 114 can utilize various computation architectures, and as such, the compute resources 114 should not be construed as being limited to any particular computation architecture or combination of computation architectures, including those explicitly disclosed herein.

The memory resource(s) 116 can include one or more hardware components that perform storage operations, including temporary or permanent storage operations. In some embodiments, the memory resource(s) 116 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 114.

The other resource(s) 118 can include any other hardware resources that can be utilized by the compute resources(s) 114 and/or the memory resource(s) 116 to perform operations described herein. The other resource(s) 118 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 108 can be virtualized by one or more virtual machine monitors ("VMMs") 120-120K (also known as "hypervisors"; hereinafter "VMMs 120") operating within the virtualization/control layer 110 to manage one or more virtual resources that reside in the virtual resource layer 112. The VMMs 120 can be or can include software, firmware, and/or hardware that alone or in combination with other software, firmware, and/or hardware, manages one or more virtual resources operating within the virtual resource layer 112. In the illustrated embodiment, the VMMs 120 can execute one or more data-driven feedback control modules 122 to perform feedback control operations disclosed herein. More particularly, the data-driven feedback control modules 122 can be executed by one or more of the VMMs 120 to perform operations to integrate monitoring strategy, data analytics and application scheduling control via a close-loop sequential flow of real-time application performance monitoring, KPI measurements, KPI violation feedback control triggering, real-time priority control initiation, and real-time feedback data monitoring and management. Additional details in this regard will be described herein below with reference to FIG. 2, which provides an overview of several illustrative examples of the data-driven feedback control modules 122, and with further reference to FIGS. 3-6, which describe specific operations each of the modules might perform.

The virtual resources operating within the virtual resource layer 112 can include abstractions of at least a portion of the compute resources 114, the memory resources 116, the other resources 118, or any combination thereof. These abstractions are referred to herein as virtual machines ("VMs"). In the illustrated embodiment, the virtual resource layer 112 includes VMs 124-124N (hereinafter "VMs 124"). The VMs 124 can execute the non-real-time applications 104 and the real-time applications 106. Each of the VMs 124 can execute multiple applications, including any combination of the non-real-time applications 104 and the real-time applications 106. For example, one or more of the VMs 124 can execute one or more of the real-time applications 106 to utilize or provide, at least in part, one or more services such as, but not limited to, DNS, RADIUS, DHCP, LDAP, content routing in either or both of the control and data planes, and route reflecting in either or both the control and data planes. The real-time applications 106 also can include one or more applications that provide, at least in part, one or more real-time services such as, but are not limited to, VoIP, streaming video service, videoconferencing service, online gaming service, chatting service, IM service, and the like in the service plane.

In some embodiments, a server can include a plurality of server clusters. A server cluster can include one or more of the VMs 124, one or more of the VMMs 120, and a plurality of host hardware resources, such as one or more of the computing resources 114, one or more of the memory resources 116, and one or more of the other resources 118.

Figure 2:
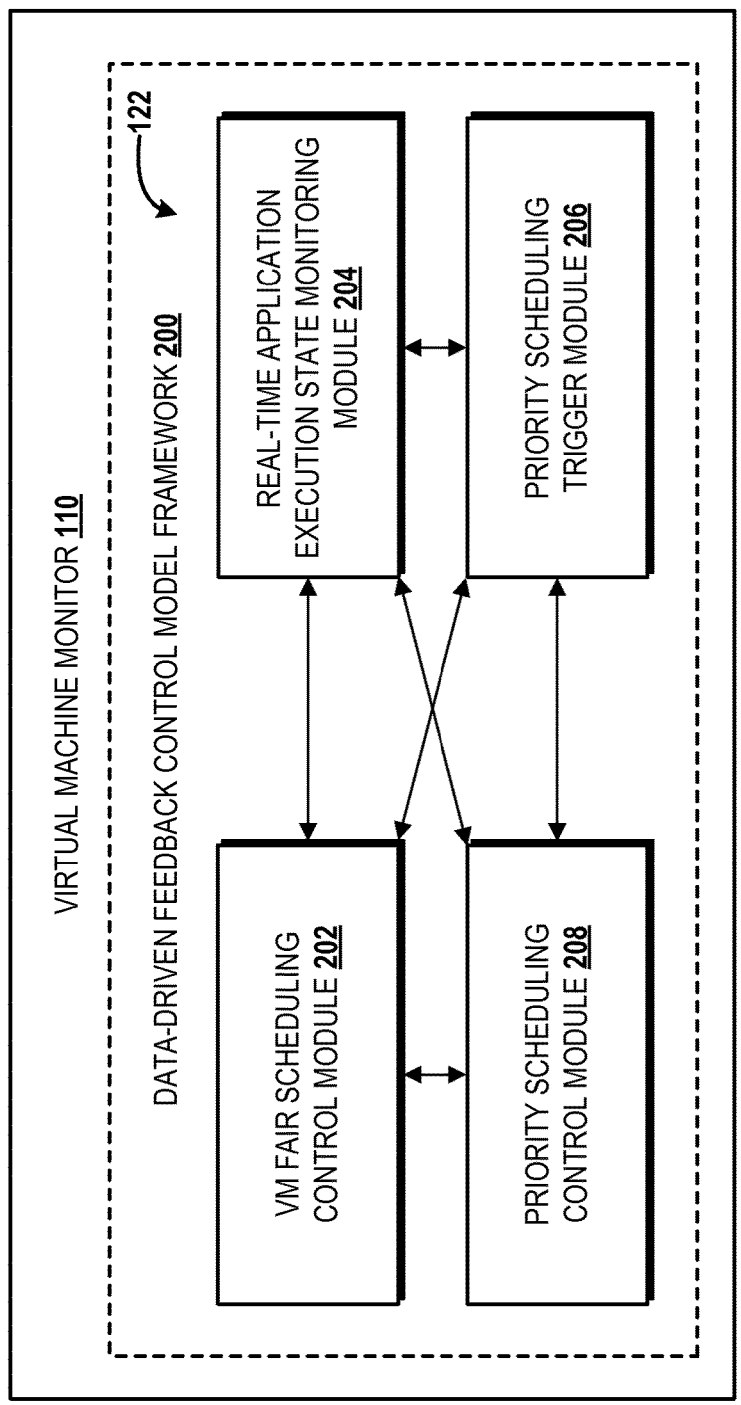
FIG. 2 is a block diagram illustrating aspects of an illustrative data-driven feedback control model framework for implementing the various concepts and technologies disclosed herein.

Turning now to FIG. 2, an illustrative example of a data-driven feedback control model framework 200, including the data-driven feedback control modules 122 introduced in FIG. 1, will be described in context of execution via one of the VMMs 120. In the illustrated embodiment, the data-driven feedback control model framework 200 includes a VM fair scheduling control module 202, a real-time application execution state monitoring module 204, a priority scheduling trigger module 206, and a priority scheduling control module 208. In summary, the data-driven feedback control model framework 200 performs functions, including: applying fair scheduling control as a baseline scheduling control scheme; monitoring real-time application throughput data associated with the operation of the real-time applications 106; measuring KPI for use in computing real-time application transaction completion rates; triggering priority scheduling control; initiating priority scheduling control for real-time application transactions; and returning to fair scheduling control. Each of the data-driven feedback control modules 122 of the illustrated data-driven feedback control model framework 200 will now be described in detail.

The VM fair scheduling control module 202 provides virtualization control functions to control virtualization of resources in the hardware resource layer 108 in accordance with a normal mode of scheduling control. In some embodiments, the VM fair scheduling control module 202 is or includes a baseline hypervisor scheduler that provides default scheduling to maximize resource utilization. In other words, the VM fair scheduling control module 202 provides fairness among the available hardware resources to maximize resource utilization. As explained above, real-time and virtualization by design are at odds with each other. Virtualization spreads computing resources across multiple VMs as a way to increase server utilization and flexibility. Real-time applications dedicate specific resources to reduce computing overhead and to ensure low latency. The VM fair scheduling control module 202 can implement fair scheduling and load balancing to maximize resource utilization. Fair scheduling and load balancing functions do not support real-time application performance requirements well during capacity reduction and/or network overload events. For this reason, the other modules of the illustrated data-driven feedback control model framework 200 facilitate priority mode scheduling for one or more of the real-time applications 106 as an exception.

The VM fair scheduling control module 202 provides a baseline control schedule to control the virtualization of resources for executing, at least in part, the non-real-time-applications 104 and the real-time applications 106 under normal operating conditions. For example, a threshold value can be established for a real-time application transaction completion rate such that when a completion rate of real-time application transactions during execution in a given time period is detected below the threshold value, the priority scheduling control module 208 can be triggered to overtake control of scheduling of resource virtualization. As used herein, a "real-time application transaction completion rate" is defined as a percentage of real-time application transactions successfully completed divided by a total number of application transactions being processed in a given time period. If and when the real-time application transaction rate returns to above the threshold value in a predetermined measure time interval, the VM fair scheduling control module 202 can retake control of scheduling of resource virtualization. Each of the real-time applications 106 can be assigned one or more threshold values for real-time application transaction rate. It is contemplated that the threshold values might change based upon time of day and/or other factors.

The real-time application execution state monitoring module 204 tracks execution states of one or more of the VMs 124 in real-time and marks time stamps for when the execution state changes. The application execution states can include a run execution state, a ready execution state, and a wait execution state. The run execution state indicates that an application (e.g., one of the non-real-time applications 104 or the real-time applications 106), or at least a portion thereof, is currently in execution by one or more of the VMs 124. The ready execution state indicates that an application (e.g., one of the non-real-time applications 104 or the real-time applications 106), or at least a portion thereof, is in a processing queue for execution by one or more of the VMs 124 but is not currently in execution. The wait execution state indicates that an application (e.g., one of the non-real-time applications 104 or the real-time applications 106), or at least a portion thereof, is not in the processing queue of one or more of the VMs 124 and is not currently in execution. Additional details regarding functions performed by the real-time application execution state monitoring module 204 are provided below with reference to FIGS. 4A-4B.

The priority scheduling trigger module 206 triggers priority scheduling when a critical condition for real-time application transactions is detected. A critical condition can be expressed as a real-time application transactions completion rate below a pre-set threshold value, where the real-time application transaction completion rate is equal to a number of real-time application transactions being successfully processed divided by a number of real-time application transactions entering into a host resource cluster in a given time period.

The priority scheduling control module 208 can be triggered by the priority scheduling trigger module 206 when a critical condition for real-time application transactions is detected. The priority scheduling control module 208 can reset the run execution state of one or more of the VMs 124 executing one or more of the non-real-time applications 104 to the ready execution state before time-out (e.g., 50 milliseconds) via an interrupt request or signal. The priority scheduling control module 208 can set one or more of the real-time applications 106 queued on one or more of the VMs 124 to the run execution state.

Figure 3:
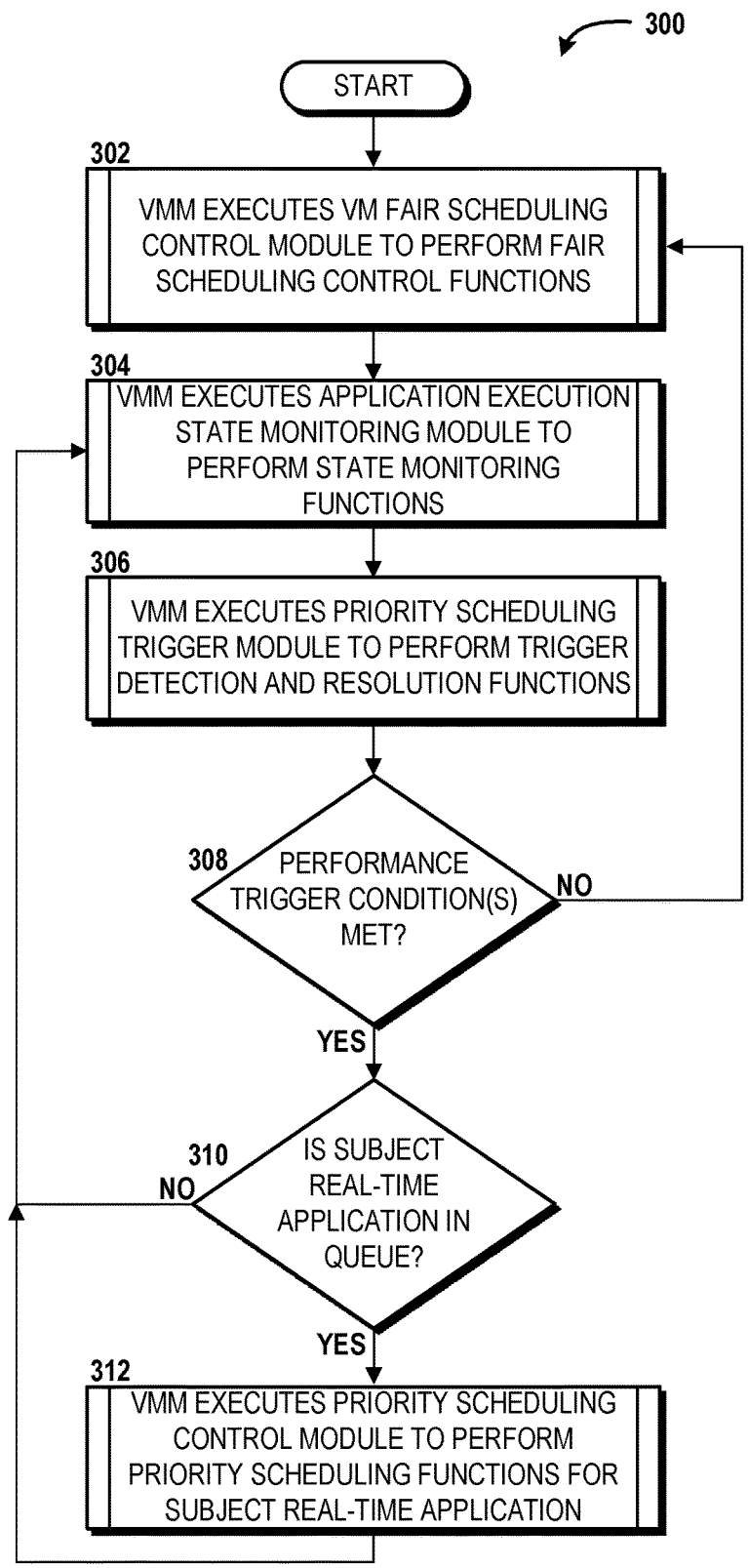
FIG. 3 is a flow diagram illustrating aspects of a method for utilizing a data-driven feedback control model to perform operations, according to an illustrative embodiment.

Turning now to FIG. 3, aspects of a method 300 for implementing the data-driven feedback control model framework 200 by one of the VMMs 120, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the NVP 102, such as one or more of the compute resources 114, and/or a processor one or more other computing systems and/or devices disclosed herein to perform operations.

For purposes of illustrating and describing some of the concepts of the present disclosure, the methods disclosed herein are described as being performed, at least in part, by one or more of the VMMs 120 executed by one or more of the hardware resources of the hardware resource layer 108 described herein above with reference to the illustrative NVP 102 in FIG. 1, via execution of one or more software modules, which may be embodied, at least in part, by the data-driven feedback control modules 122 of the data-driven feedback control model framework 200 described above with reference to FIG. 2. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIGS. 1 and 2. The method 300 begins at operation 302, where the VMM 120 executes the VM fair scheduling control module 202 to perform scheduling control functions. The scheduling control functions can include controlling virtualization of resources in the hardware resource layer 108 in accordance with a normal mode of scheduling control. The VM fair scheduling control module 202, as described above, provides a baseline control schedule to control the virtualization of resources for executing, at least in part, the non-real-time-applications 104 and the real-time applications 106 under normal operating conditions. For example, a threshold value can be established for a real-time application transaction completion rate such that when a transaction completion rate of a real-time application, in a given time period, is detected below the threshold value, the priority scheduling control module 208 can be triggered to overtake control of scheduling of resource virtualization. If and when the real-time application transaction completion rate returns to above the threshold value in a pre-set measured time period, the VM fair scheduling control module 202 can retake control of scheduling of resource virtualization. Each of the real-time applications 106 can be assigned one or more threshold values for the real-time application transaction completion rate. It is contemplated that the applicable transaction completion rate value might change based upon time of day and/or other factors.

From operation 302, the method 300 proceeds to operation 304, where the VMM 120 executes the real-time application execution state monitoring module 204 to perform state monitoring functions. The state monitoring functions can include tracking application execution states on the VMs 124 and marking time stamps for execution state changes. The application execution states can include a run execution state, a ready execution state, and a wait execution state, each of which is described above.

From operation 304, the method 300 proceeds to operation 306, where the VMM 120 executes the priority scheduling trigger module 206 to perform trigger detection and resolution functions. The trigger detection and resolution functions can include detecting a critical condition. A critical condition can be expressed as the real-time application transactions completion rate in a given time period drops below a pre-set threshold value, where the real-time application transaction completion rate is equal to a number of real-time application transactions being successfully processed divided by a number of real-time application transactions entering into a host cluster in a given time period. In particular, from operation 306, the method 300 proceeds to operation 308, where the VMM 120 executes the priority scheduling trigger module 206 to determine whether one or more performance trigger conditions have been met. If not, the method 300 returns to operation 302. If so, the method 300 proceeds to operation 310, where the VMM 120 executes the priority scheduling trigger module 206 to determine whether a subject real-time application is presently in queue for processing. If not, the method 300 returns to operation 304. If so, the priority scheduling trigger module 206 triggers the priority scheduling control module 208 and the method 300 proceeds to operation 312.

At operation 312, the VMM 120 executes the priority scheduling control module 208 to perform priority scheduling functions for the subject real-time application 106. The priority scheduling functions can include resetting the run execution state of one or more of the VMs 124 executing one or more of the non-real-time applications 104 to the ready execution state before time-out (e.g., 50 milliseconds) via an interrupt request or signal. The priority scheduling control module 208 can set one or more of the subject real-time applications 106 queued on one or more of the VMs 124 to the run execution state. From operation 312, the method 300 can return to operation 304.

Figure 4A:
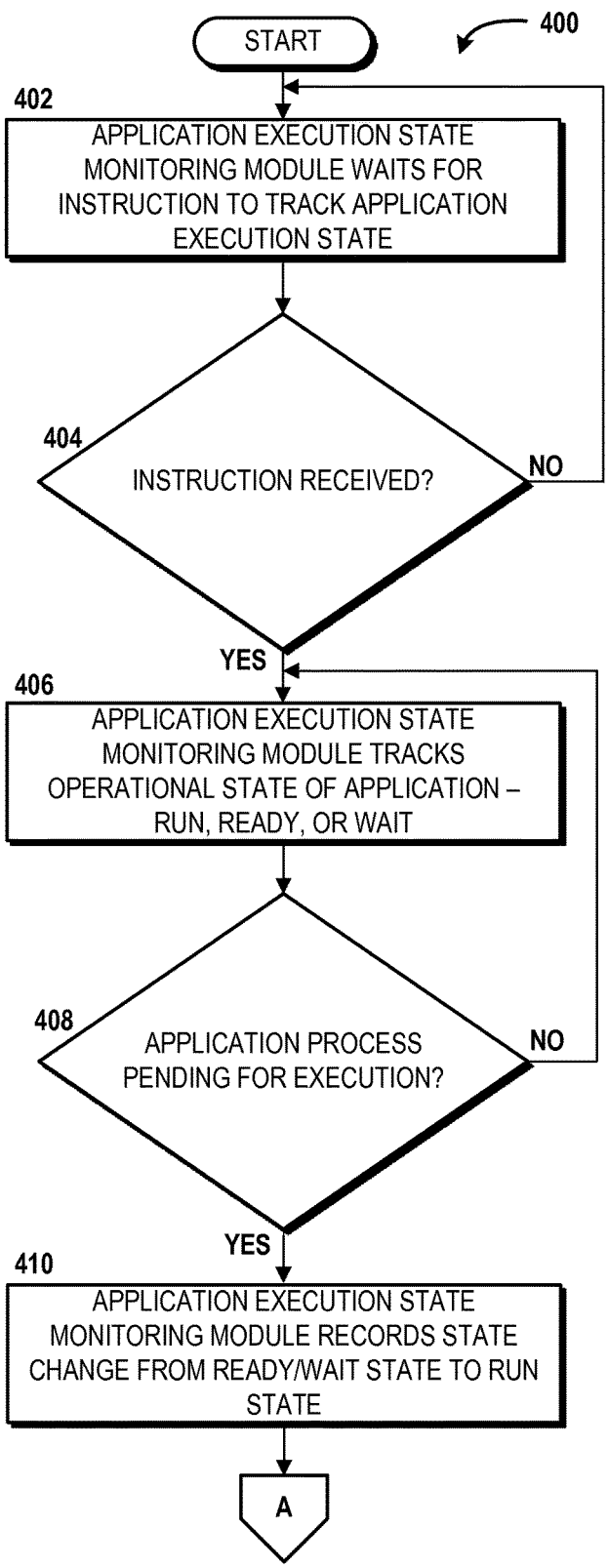
FIGS. 4A-4B are flow diagrams illustrating aspects of a method for executing an application execution state monitoring module to perform state monitoring functions, according to an illustrative embodiment.
Figure 4B:
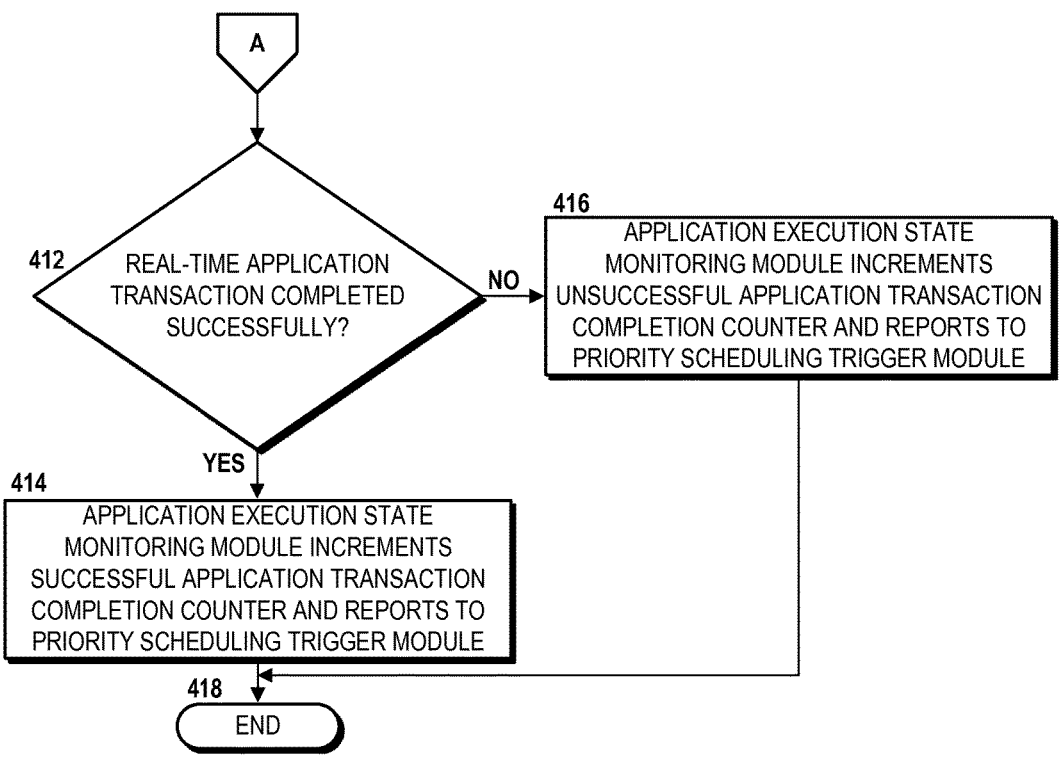

Turning now to FIGS. 4A-4B, a method 400 for executing the real-time application execution state monitoring module 204 will be described in detail, according to an illustrative embodiment. The method 400 will be described from the perspective of one of the VMMs 120 executing the real-time application execution state monitoring module 204 to perform various operations. Moreover, the method 400 will be described with reference to FIGS. 4A-4B and further reference to FIGS. 1 and 2.

The method 400 begins and proceeds to operation 402, where the real-time application execution state monitoring module 204 waits for an instruction to track one or more applications, such as one or more of the real-time applications 106. From operation 402, the method 400 proceeds to operation 404, where the real-time application execution state monitoring module 204 determines whether an instruction to track one or more applications has been received. If no instruction is received, the method 400 returns to operation 402. If an instruction to track one or more applications is received, the method 400 proceeds to operation 406, where the real-time application execution state monitoring module 204 tracks the execution state of the application(s) identified in the instruction. The execution state can be run, ready, or wait. The ready and wait execution states are execution states indicative of an application transaction that is pending execution.

From operation 406, the method 400 proceeds to operation 408, where the real-time application execution state monitoring module 204 determines whether a real-time application transaction is pending execution. If not, the method 400 returns to operation 406. If so, the method 400 proceeds to operation 410, where the real-time application execution state monitoring module 204 records a state change from a ready or wait execution state to a run state.

Turning now to FIG. 4B, the method 400 proceeds from operation 410 to operation 412, where the real-time application execution state monitoring module 204 determines whether the application transaction has completed successfully. If so, the method 400 proceeds to operation 414, where the real-time application execution state monitoring module 204 increments a successful application transaction completion counter and reports to the priority scheduling trigger module 206. If not, the method 400 proceeds to operation 416, where the real-time application execution state monitoring module 204 increments an unsuccessful application transaction completion counter and reports to the priority scheduling trigger module 206. The real-time application execution state monitoring module 204 counts a total number of real-time application transactions in a given period by summing the number of real-time application transactions completed successfully and the number of real-time application transactions completed unsuccessfully in the given time period. From operation 416, the method 400 proceeds to operation 418, where the method 400 ends.

Figure 5:
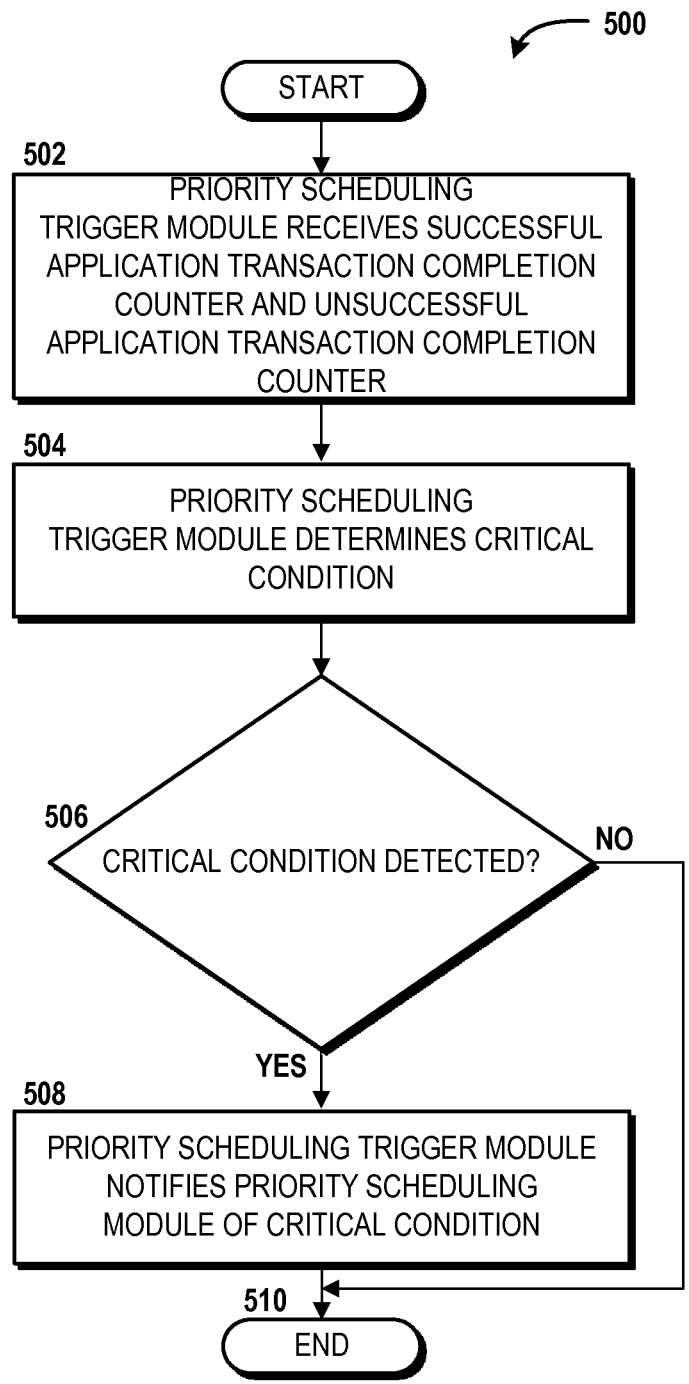
FIG. 5 is a flow diagram illustrating aspects of a method for executing a priority scheduling trigger module to perform priority scheduling trigger functions, according to an illustrative embodiment.

Turning now to FIG. 5, a method 500 for executing the priority scheduling trigger module 206 will be described in detail, according to an illustrative embodiment. The method 500 will be described from the perspective of one of the VMMs 120 executing the priority scheduling trigger module 206 to perform various operations. Moreover, the method 500 will be described with reference to FIG. 5 and further reference to FIGS. 1 and 2.

The method 500 begins and proceeds to operation 502, where the priority scheduling trigger module 206 receives the successful application transaction completion counter and the total real-time application transaction counter entering into a host server cluster in a given time period from the real-time application execution state monitoring module 204. From operation 502, the method 500 proceeds to operation 504, where the priority scheduling trigger module 206 determines a critical condition for real-time application transactions.

From operation 504, the method 500 proceeds to operation 506, where the priority scheduling trigger module 206 determines whether the critical condition determined at operation 504 has been detected. If so, the method 500 proceeds to operation 508, where the priority scheduling trigger module 206 notifies the priority scheduling control module 208 of the critical condition. From operation 508, the method 500 proceeds to operation 510, where the method 500 ends. If not, the method 500 proceeds directly to operation 510.

Figure 6:
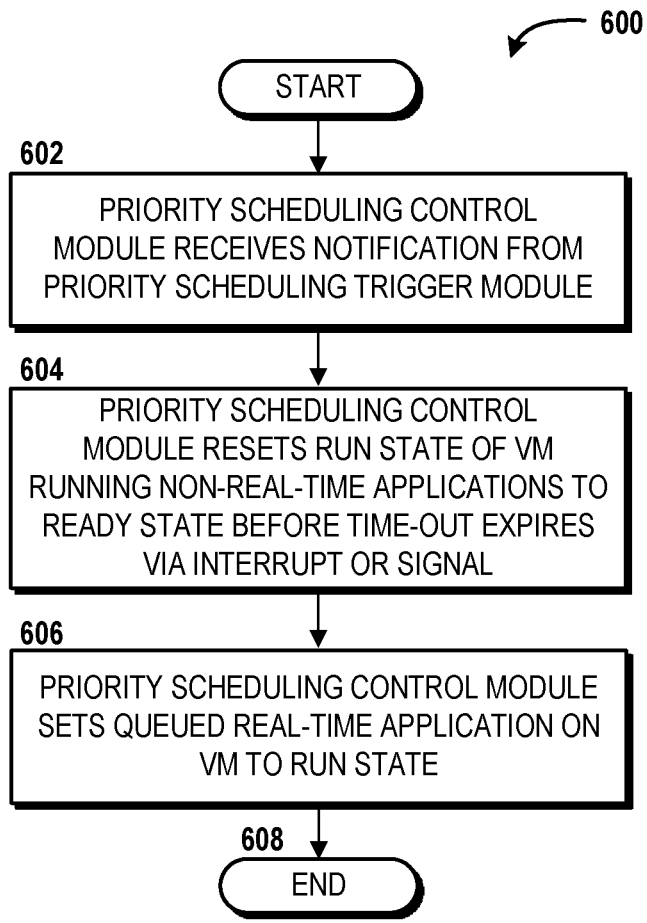
FIG. 6 is a flow diagram illustrating aspects of a method for executing a priority scheduling control module to perform priority scheduling functions, according to an illustrative embodiment.

Turning now to FIG. 6, a method 600 for executing the priority scheduling control module 208 for real-time application transactions will be described in detail, according to an illustrative embodiment. The method 600 will be described from the perspective of one of the VMMs 120 executing the priority scheduling control module 208 to perform various operations. Moreover, the method 600 will be described with reference to FIG. 6 and further reference to FIGS. 1 and 2.

The method 600 begins and proceeds to operation 602, where the priority scheduling control module 208 receives notification from the priority scheduling trigger module 206 to enter a priority scheduling mode for real-time application transactions. From operation 602, the method 600 proceeds to operation 604, where the priority scheduling control module 208 resets the run state of the VM running any of the non-real-time applications 104 to a ready state before a time-out expires via an interrupt request or signal.

From operation 604, the method 600 proceeds to operation 606, where the priority scheduling control module 208 sets the queued real-time application on the VM to the run state. From operation 606, the method 600 proceeds to operation 608. The method 600 ends at operation 608.

Figure 7:
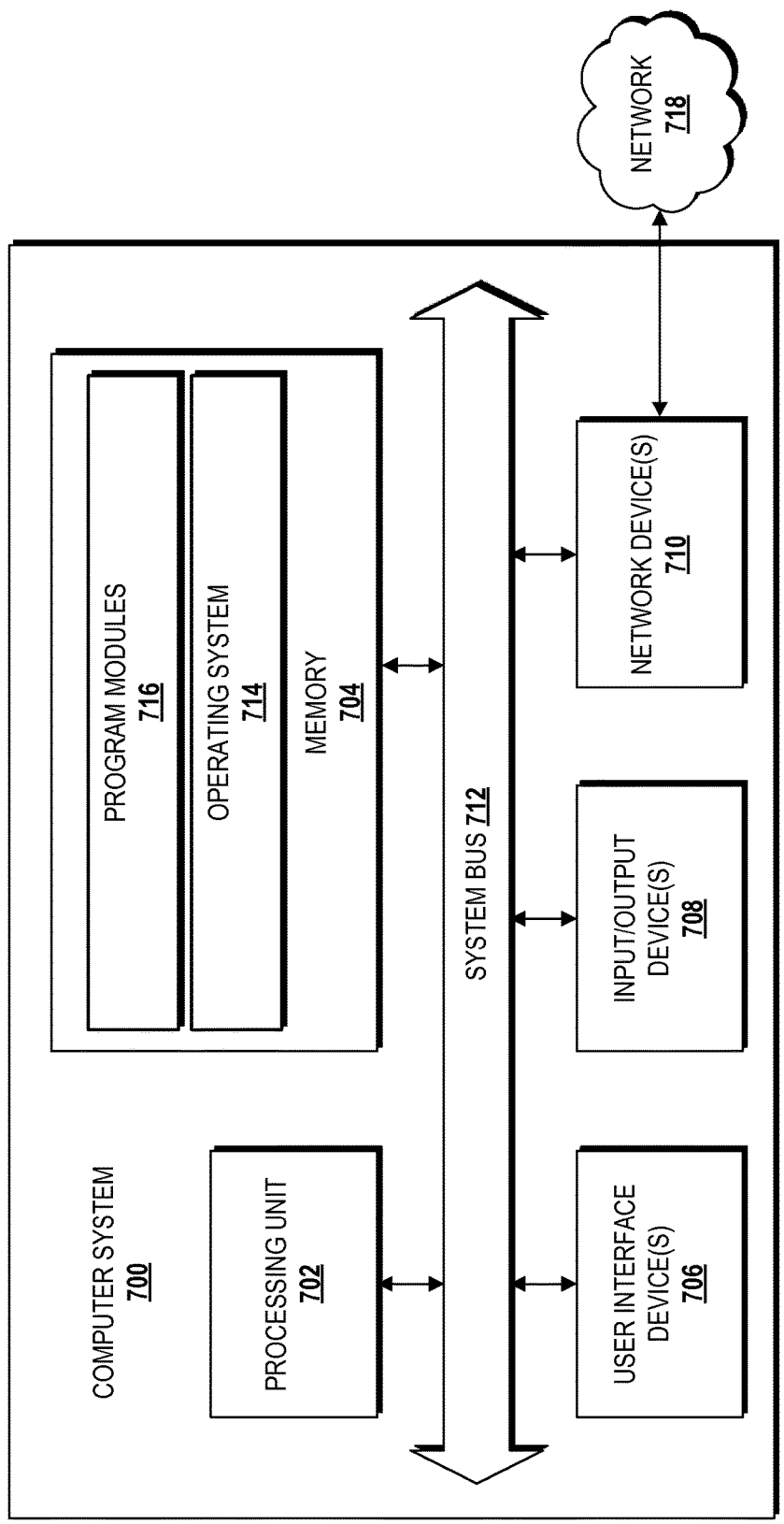
FIG. 7 is a block diagram illustrating an example computer system capable of implementing aspects of the embodiments presented herein.

FIG. 7 is a block diagram illustrating a computer system 700 configured to provide the functionality in accordance with various embodiments of the concepts and technologies disclosed herein. In some implementations, at least a portion of the hardware resources in the hardware resource layer 108 (best illustrated in FIG. 1) are provided, at least in part, by one or more host server computers (collectively, "host server cluster") is configured like the architecture of the computer system 700. It should be understood, however, that modification to the architecture may be made to facilitate certain interactions among elements described herein. In some implementations, the compute resources 114, the memory resources 116, and/or the other resources 118 are configured like the architecture of the computer system 700 or portions thereof.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 114 can include one or more instances of the processing units 702.

The memory 704 communicates with the processing unit 702 via the system bus 712. In some embodiments, the memory 704 is operatively connected to a memory controller (not shown) that enables communication with the processing unit 702 via the system bus 712. The memory resources 116 can include one or more instances of the memory 704. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. For example, the program modules can include the data-driven feedback control modules 122, including the VM fair scheduling control module 202, the real-time application execution state monitoring module 204, the priority scheduling trigger module 206, the priority scheduling control module 208, or some combination thereof. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be a wired network such as, but not limited to, a Wide Area Network ("WAN"), a wired Personal Area Network ("PAN"), or a wired Metropolitan Area Network ("MAN"). The network 718 may be any other network described herein.

Figure 8:
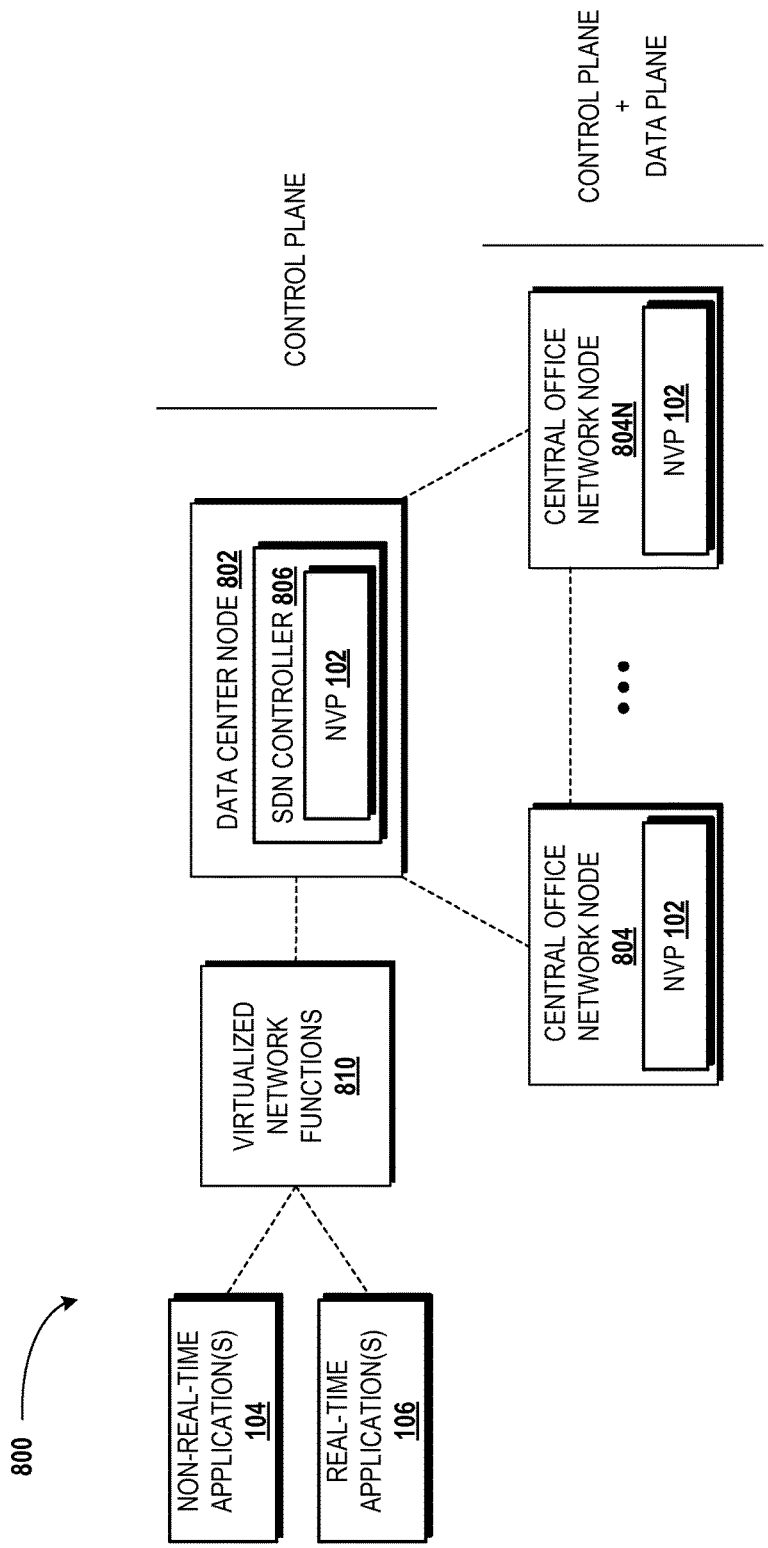
FIG. 8 is a diagram illustrating a software defined network ("SDN"), according to an illustrative embodiment.

Turning now to FIG. 8, details of a software-defined network ("SDN") 800 are illustrated, according to an illustrative embodiment. The illustrated SDN 800 is configured in an exemplary SDN configuration and should not be construed as being limiting in any way.

The illustrated SDN 800 includes a data center node 802 and a plurality of central office network nodes 804-804N. The illustrated data center node 802 includes a centralized SDN controller 806. The centralized SDN controller 806 can perform on-demand resource allocation tasks on the central office network nodes 804-804N on-demand in the control plane through the NVP 102. The central office network nodes 804-804N can perform hardware reconfiguration tasks in the data plane and virtualized network functions 810 in the control plane. The virtualized network functions 810 can execute at least a portion of the non-real-time applications 104 and the real-time applications 106 (best shown and described with reference to FIG. 1).

Based on the foregoing, it should be appreciated that concepts and technologies directed to data-driven feedback control system for real-time application support in virtualized networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A network virtualization platform comprising:
   a plurality of hardware resources;
   a virtual machine; and
   a virtual machine monitor comprising a plurality of data-driven feedback control modules that, when executed by a compute resource of the plurality of hardware resources, causes the virtual machine monitor to perform operations comprising
      tracking an execution state of each of a plurality of applications associated with the virtual machine,
      measuring a real-time application transaction completion rate of the virtual machine, wherein the real-time application transaction completion rate is equal to a number of real-time application transactions being successfully processed divided by a number of real-time application transactions entering the network virtualization platform in a given time period,
      determining whether a trigger condition exists by comparing the real-time application transaction completion rate and a pre-set threshold value, and
      in response to determining that the trigger condition exists, applying a priority control schedule to instruct the virtual machine to perform priority processing of a real-time application of the plurality of applications over a non-real-time application of the plurality of applications.

2. The network virtualization platform of claim 1, wherein the plurality of data-driven feedback control modules comprises a virtual machine fair scheduling module, and wherein the operations further comprise applying a fair control schedule to instruct the virtual machine to perform baseline processing of the plurality of applications.

3. The network virtualization platform of claim 2, wherein the plurality of data-driven feedback control modules comprises an application execution state monitoring module and a priority scheduling trigger module, and wherein tracking the execution state of each of the plurality of applications associated with the virtual machine comprises:
   determining whether an application transaction of the real-time application is in a processing queue for execution by the virtual machine;
   in response to determining that the application transaction of the real-time application is in the processing queue for execution by the virtual machine, recording a state change from a ready/wait execution state to a run execution state;
   determining whether the application transaction of the real-time application completed successfully;
   if the application transaction completed successfully, incrementing a successful application transaction completion counter and reporting the successful application transaction completion counter to the priority scheduling trigger module of the plurality of data-driven feedback control modules; and
   if the application transaction did not complete successfully, incrementing an unsuccessful application transaction completion counter and reporting the unsuccessful application transaction completion counter to the priority scheduling trigger module of the plurality of data-driven feedback control modules.

4. The network virtualization platform of claim 3, wherein the plurality of data-driven feedback control modules comprises a priority scheduling trigger module and a priority scheduling control module, and wherein determining whether the trigger condition exists comprises:
   receiving the successful application transaction completion counter and the unsuccessful application transaction completion counter from the application execution state monitoring module;
   determining a critical condition that specifies when the real-time application transaction completion rate drops below the pre-set threshold value; and
   in response to determining that the critical condition exists, notifying the priority scheduling control module of the critical condition.

5. The network virtualization platform of claim 4, wherein applying the priority control schedule to instruct the virtual machine to perform priority processing of the real-time application of the plurality of applications over the non-real-time application of the plurality of applications is in response to receiving notification from the priority scheduling trigger module.

6. The network virtualization platform of claim 5, wherein applying the priority control schedule to instruct the virtual machine to perform priority processing of the real-time application of the plurality of applications over the non-real-time application of the plurality of applications comprises:
   resetting a first execution state of the non-real-time application on the virtual machine to ready/wait; and
   setting a second execution state of the real-time application on the virtual machine to run.

7. The network virtualization platform of claim 6, wherein resetting the first execution state of the non-real-time application on the virtual machine to ready/wait comprises resetting the first execution state of the non-real-time application on the virtual machine to ready/wait prior to a time-out.

8. A method comprising:
   tracking, by a virtual machine monitor executed by a compute resource of a plurality of hardware resources of a network virtualization platform, an execution state of each of a plurality of applications associated with a virtual machine;
   measuring, by the virtual machine monitor, a real-time application transaction completion rate of the virtual machine, wherein the real-time application transaction completion rate is equal to a number of real-time application transactions being successfully processed divided by a number of real-time application transactions entering the network virtualization platform in a given time period;

determining, by the virtual machine monitor, whether a trigger condition exists by comparing the real-time application transaction completion rate and a pre-set threshold value; and in response to determining that the trigger condition exists, applying, by the virtual machine monitor, a priority control schedule to instruct the virtual machine to perform priority processing of a real-time application of the plurality of applications over a non-real-time application of the plurality of applications.

9. The method of claim 8, further comprising applying a fair control schedule to instruct the virtual machine to perform baseline processing of the plurality of applications.

10. The method of claim 9, wherein tracking the execution state of each of the plurality of applications associated with the virtual machine comprises:

determining whether an application transaction of the real-time application is in a processing queue for execution;

in response to determining that the application transaction of the real-time application is in the processing queue for execution, recording a state change from a ready/wait execution state to a run execution state;

determining whether the application transaction of the real-time application completed successfully;

if the application transaction completed successfully, incrementing a successful application transaction completion counter and reporting the successful application transaction counter; and if the application transaction did not complete successfully, incrementing an unsuccessful application transaction completion counter and reporting the unsuccessful application transaction completion counter.

11. The method of claim 10, wherein determining whether the trigger condition exists comprises:

receiving the successful application transaction completion counter and the unsuccessful application transaction completion counter; and determining that a critical condition exists, wherein the critical condition specifies when the application transaction completion rate drops below a threshold value.

12. The method of claim 11, wherein applying the priority control schedule to instruct the virtual machine to perform priority processing of the real-time application of the plurality of applications over the non-real-time application of the plurality of applications is in response to receiving notification that the critical condition exists.

13. The method of claim 12, wherein applying the priority control schedule to instruct the virtual machine to perform priority processing of the real-time application of the plurality of applications over the non-real-time application of the plurality of applications comprises:

resetting a first execution state of the non-real-time application on the virtual machine to ready/wait; and setting a second execution state of the real-time application on the virtual machine to run.

14. The method of claim 13, wherein resetting the first execution state of the non-real-time application on the virtual machine to ready/wait comprises resetting the first execution state of the non-real-time application on the virtual machine to ready/wait prior to a time-out.

15. A computer-readable storage medium having instructions stored thereon that, when executed by a compute resource of a network virtualization platform, cause the compute resource to perform operations comprising:

tracking an execution state of each of a plurality of applications associated with a virtual machine operating within the network virtualization platform;

measuring a real-time application transaction completion rate of the virtual machine, wherein the real-time application transaction completion rate is equal to a number of real-time application transactions being successfully processed divided by a number of real-time application transactions entering the network virtualization platform in a given time period;

determining whether a trigger condition exists by comparing the real-time application transaction completion rate and a pre-set threshold value; and in response to determining that the trigger condition exists, applying a priority control schedule to instruct the virtual machine to perform priority processing of a real-time application of the plurality of applications over a non-real-time application of the plurality of applications.

16. The computer-readable storage medium of claim 15, wherein the operations further comprise applying a fair control schedule to instruct the virtual machine to perform baseline processing of the plurality of applications.

17. The computer-readable storage medium of claim 16, wherein tracking the execution state of each of the plurality of applications associated with the virtual machine comprises:

determining whether an application transaction of the real-time application is in a processing queue for execution;

in response to determining that the application transaction of the real-time application is in the processing queue for execution, recording a state change from a ready/wait execution state to a run execution state;

determining whether the application transaction of the real-time application completed successfully;

if the application transaction completed successfully, incrementing a successful application transaction completion counter and reporting the successful application transaction completion counter; and if the application transaction did not complete successfully, incrementing an unsuccessful application transaction completion counter and reporting the unsuccessful application transaction completion counter.

18. The computer-readable storage medium of claim 17, wherein determining whether the trigger condition exists comprises:

receiving the successful application transaction completion counter and the unsuccessful application transaction completion counter;

determining a critical condition exists, wherein the critical condition specifies when the real-time application transaction completion rate drops below the pre-set threshold value.

19. The computer-readable storage medium of claim 18, wherein applying the priority control schedule to instruct the virtual machine to perform priority processing of the real-time application of the plurality of applications over the non-real-time application of the plurality of applications is in response to receiving notification that the critical condition exists.

20. The computer-readable storage medium of claim 19, wherein applying the priority control schedule to instruct the virtual machine to perform priority processing of the real-time application of the plurality of applications over the non-real-time application of the plurality of applications comprises:

resetting a first execution state of the non-real-time application on the virtual machine to ready/wait; and
setting a second execution state of the real-time application on the virtual machine to run.

* * * * *